United States Patent [19]
Leitner et al.

[11] Patent Number: 5,335,764
[45] Date of Patent: Aug. 9, 1994

[54] POSITIVELY ENGAGING CLUTCH

[75] Inventors: Max Leitner, Steyr; Gerhard J. Frühwirth, Schönau, both of Austria

[73] Assignee: Steyr-Daimler-Puch AG, Vienna, Austria

[21] Appl. No.: 871,076

[22] Filed: Apr. 20, 1992

[30] Foreign Application Priority Data

Apr. 22, 1991 [DE] Fed. Rep. of Germany ......... 413128

[51] Int. Cl.$^5$ ..................... F16D 11/10; F16D 25/08; F16D 43/284
[52] U.S. Cl. ..................... 192/85 C; 192/103 F; 192/108; 192/114 T; 475/118; 475/138
[58] Field of Search ............ 192/103 F, 85 C, 114 T, 192/108; 475/118, 138, 261; 180/249

[56] References Cited

U.S. PATENT DOCUMENTS

| | | | |
|---|---|---|---|
| 1,686,827 | 10/1928 | Maag | 192/103 F |
| 2,110,675 | 3/1938 | Pike | 192/103 F X |
| 2,120,092 | 6/1938 | Doran | 192/103 F X |
| 2,373,453 | 4/1945 | Brunken | 192/103 F X |
| 2,398,407 | 4/1946 | Brownyer | 192/114 T X |
| 3,425,527 | 2/1969 | Wolf | 192/85 C X |
| 3,550,738 | 12/1970 | Halibrand | 192/108 X |
| 3,830,349 | 8/1974 | Williams | 192/103 F |
| 3,880,267 | 4/1975 | Auble et al. | 192/108 |
| 4,046,210 | 9/1977 | Nelson . | |
| 4,573,366 | 3/1986 | Kennard | 192/85 C X |
| 4,773,517 | 9/1988 | Watanabe | 192/103 F X |
| 4,781,266 | 11/1988 | Hotta et al. | 192/103 F X |
| 4,936,406 | 6/1990 | Tezuka et al. | 180/249 |
| 4,937,750 | 6/1990 | Gilliam | 192/103 F X |
| 5,105,902 | 4/1992 | Wilson et al. | 180/249 X |

FOREIGN PATENT DOCUMENTS

| | | |
|---|---|---|
| 0201570 | 10/1985 | European Pat. Off. . |
| 0256746 | 2/1988 | European Pat. Off. . |
| 4021653 | 1/1991 | Fed. Rep. of Germany . |
| 2311961 | 12/1976 | France . |
| 2038440 | 7/1980 | United Kingdom . |

*Primary Examiner*—Rodney H. Bonck
*Attorney, Agent, or Firm*—Meltzer, Lippe, Goldstein et al.

[57] ABSTRACT

An interengaging clutch comprises first and second rotatable clutch halves, the first clutch half being a driven clutch element connected to a first wheel drive train and being movable along an axial direction, the second clutch half being a driving clutch element and being connected to a main drive train and to a second wheel drive train. The clutch halves have circumferentially disposed dogs or teeth with intermeshing contact surfaces for engaging the clutch halves together so that torque can be transmitted from the second clutch half to the first clutch when they are interengaged and rotating at different rotational speeds. Connected to the first clutch half is a unidirectional servo component which is pressure actuated on one side only so as to move the first clutch half into engagement with the second clutch. The interengaging clutch further includes first and second rotational speed sensors which produce signals indicative of the rotational speeds of the clutch halves. An electronic control unit is provided which causes the servo component to be pressure actuated in one direction only so that the clutch halves are brought into engagement based on the signals received from the rotational speed sensors. For disengagement, a spring is provided which acts in a direction opposite to that of the servo component with a spring force which is sufficient to overcome the frictional forces generated on the control surfaces when the transmitted torque falls to a predetermined, preferably very low, value.

21 Claims, 7 Drawing Sheets

POSITIVELY ENGAGING CLUTCH

BACKGROUND OF THE INVENTION

The invention relates to a positively engaging clutch having a first driven clutch half that is connected to a first wheel drive train and is axially movable by an electronically actuated servo component, and a second driving clutch half which is connected to a main drive train and a second wheel drive train.

In heavy motor vehicles, in particular trucks or tractors, high torque forces must be transmitted, and this requires large and expensive components when friction clutches are used. In vehicles having a front wheel drive that can be engaged, and in vehicles having a locking intra-axle differential or a locking central differential, more compact positively engaging clutches, referred to herein as interengaging clutches, are frequently used in place of large friction clutches. An example of a positively engaging clutch is a dog clutch.

Interengaging clutches have, however, the great disadvantage that generally they cannot be shifted at all where the vehicle stands still, or can only be shifted by a very experienced driver during travel. Also, the two clutch halves of such a clutch must be brought into engagement with each other with a very fine touch and when the difference in RPM's is small. Generally, this must be done even before the vehicle reaches difficult terrain where a switch to four-wheel drive is required or where the differential lock would take effect, so that tire wear is increased. Disengagement is also difficult because considerable frictional forces arise between the clutch halves due to the torque between the claws of the clutch halves, and such frictional forces must be overcome when the clutch halves are to be pulled apart. Often a spring is used to decrease the expenditure of force needed to disengage the clutch; but this increases the force required for clutch engagement. For this reason, all-wheel drive or a differential lock is often allowed to remain engaged longer than necessary and is sometimes forgotten, leading to steering difficulties in normal road travel.

Hydraulic or pneumatic force amplifiers, or even electrical elements, are sometimes used as servo components to engage and disengage the clutch halves of an interengaging clutch, such as a dog clutch. Such automatic engagement systems are known, but they are expensive because of the necessity for a fine touch to engage the clutch.

The servo components in such systems must be bidirectional and must be of relatively large size as they must engage the clutch, keep it engaged during travel, and disengage it at the correct time. This requires a high energy consumption with hydraulic or pneumatic actuation because of leakages making it necessary for the oil or air pump to run constantly, and furthermore involving thermal losses with electric actuators.

DE-OS 40 21 653 discloses that the contact surfaces of a dog clutch can be inclined In the axial direction to decrease the required actuation forces. But this causes considerable and permanent axial forces to develop which must be absorbed by a locking device which increases the number of parts and requires more construction space. Yet a holding force, even if it is a small one, is still required, and although the torque opens the clutch automatically, it does so only after a disengagement force is applied.

However, if the engagement of the clutch is to be entirely automatic a second problem arises. This problem is that when the vehicle is not at a standstill, the slipping of the driven wheels as far as the vehicle is concerned, and the rotational speed difference between the two clutch halves (referred to herein as slippage) as far as the clutch is concerned, are the determining criteria for engagement of the clutch. On the other hand, the transmitted torque is the criterion for disengagement of the clutch.

When a dog clutch is engaged, the affected drive trains are rigidly connected so that no speed difference between the clutch halves is available as a criterion for disengagement. To measure torque, however, is not only expensive but much too imprecise to ensure disengagement at the correct moment. Automatic disengagement is also problematic because it must take place against the friction developed between the clutch surfaces being pressed together by the transmitted torque. In addition, measurement of the transmitted torque is also difficult because transient oscillations due to elasticity in the drive trains occur, so that defects in driving are not uncommon in practice.

The disadvantages and problems described above also apply when interengaging clutches are used in conjunction with locking intra-axle and inter-axle differentials such as are used in more expensive power drive transmissions.

It is the object of the instant invention to provide an improved interengaging clutch so that the problems described above can be avoided in a simple manner, i.e., to provide an interengaging clutch, such as a dog clutch which engages and disengages automatically and at the right moment.

SUMMARY OF THE INVENTION

This and other objects are achieved by the interengaging clutch of the present invention which comprises first and second rotatable clutch halves, the first clutch half being a driven clutch element connected to a first wheel drive train and being movable along an axial direction, the second clutch half being a driving clutch element and being connected to a main drive train and to a second wheel drive train. The first and second clutch halves have circumferentially disposed dogs or teeth with intermeshing contact surfaces for engaging the first and second clutch halves together so that torque can be transmitted from the second clutch half to the first clutch when they are interengaged. Connected to one of the clutch halves is a unidirectional servo component which is pressure actuated on one side only so as to move the clutch halves into engagement with each other. The interengaging clutch further includes first and second rotational speed sensors which produce signals indicative of the rotational speeds of the first and second clutch halves. An electronic control unit is provided which causes the servo component to be pressure actuated in one direction only so that the first and second clutch halves are brought into engagement based on the signals received from the rotational speed sensors. For disengagement, a spring is provided which acts An a direction opposite to that of the servo component with a spring force which is sufficient to overcome the frictional forces generated on the control surfaces widen the transmitted torque falls to a predetermined, preferably very low, value.

The use of clutch halves having teeth or dogs with contact surfaces constituted substantially by axial generatrices in combination with a spring applying a precisely calculated spring force in the direction of disengagement ensures that once engaged, the clutch will remain engaged only through the transmission of torque, and will be disengaged by the spring only when the torque drops below a given low value. Thus, the spring ensures reliable disengagement without special technical expenditure and without electronic disengagement control. The action of the control unit can thus be limited to engagement, and the speed sensors make it possible for the control unit to engage the clutch at the right moment according to reliable engagement criteria, e.g., at certain predetermined slippage thresholds.

The slippage thresholds are set at rotational speed differences of the clutch halves at which the clutch halves can still be easily brought into engagement. The pre-set thresholds are related to the rotational speed differences of the front and rear wheels when one wheel is slipping, but are higher than the difference which would occur when the vehicle makes a turn. Therefore, it is not necessary to include a steering angle sensor with additional logic.

In order for the spring alone to automatically disengage the clutch halves at the optimal moment, the spring force must be selected so as to overcome the frictional forces which are present at the disengaging torque level and also to overcome the inertia of the affected masses in the clutch and the servo components. Desirably, the spring is selected no that disengagement of the clutch halves occurs when the transmitted torque falls into a small interval centered on zero transmitted torque. This means that the clutch halves will disengage automatically and with essentially no time delay as the transmitted torque is dropping and goes through a zero passage. This is possible with the interengaging clutch of the present invention whereas prior pneumatic, hydraulic, and/or electronic attempts to cause the clutch halves to disengage at the zero torque passage have been largely unsuccessful. Furthermore, if there is a premature disengagement, the electronic control unit of the present clutch will cause immediate re-engagement.

Thus, a practical solution of the problem on which the instant invention is based is found only through the combination of an electronic control unit causing the clutch halves to become engaged when predetermined slippage thresholds are exceeded, and a spring mechanism causing the clutch halves to become disengaged when the transmitted torque approaches zero.

This surprisingly simple solution to the problems which arise with prior art devices overcomes the prejudice that shifting dependent upon threshold values could not be left to themselves. It has proven itself very well, however, under test driving conditions. Also, in situations where unwanted disengagement could have been expected, such as when driving over a hump or as a result of load impact, disengagement did not occur. In retrospect, the success may be explained by the interaction of bracing and elastic forces in the drive trains with high inertial masses.

When the interengaging clutch is a dog clutch having dogs projecting in the axial direction, the dogs of the two clutch halves can be provided with faces having angled contact surfaces in order to facilitate automatic engagement in a wider slippage range.

In vehicles where lower bracing forces and inertial forces occur, premature automatic disengagement of the clutch can be avoided if the contact surfaces of the dogs are constituted by generatrices which are angled inwardly in the circumferential direction by a very small angle.

Instead of a dog clutch having axially projecting dogs, the present invention can also be realized in a clutch in which a first clutch half has a set of outwardly projecting teeth while a second clutch half has a corresponding set of meshing teeth which project inwardly.

An advantageous design of the invention is achieved if the servo component is constituted by a cylinder, a piston, and a piston rod, wherein the piston is subjected to a pressure medium on one side and to the force of a compression spring on the other side. Such a design wherein the cylinder and the spring are located outside the direct clutch area affords good accessibility for maintenance without requiring additional space in the clutch area, and even makes it possible to retrofit a pre-existing clutch with a servo component according to the invention.

An additional design simplification of the servo component is achieved if the piston rod and a gearshift fork are firmly connected to each other and can be moved parallel to the axis. In this way, the guide of the piston rod can be used at the same time as the guide of the gearshift fork and the latter need not be mounted so as to be capable of swivelling.

In an advantageous embodiment of the invention, the control unit comprises a signal processing part including two converters for producing two rotational-speed signals and an adder to produce a slippage signal from the two rotational-speed signals, a logic section, a process control section, and an amplifier for actuating the servo component. Thanks to these components of the control unit, a rotational-speed difference signal can be obtained independently of any special arrangement or application of the clutch, and reliable engagement of the clutch taking into account all travel states can be achieved.

If the control unit is also provided in the signal processing section with a computing element which corrects for gear ratios, the positioning of the sensors becomes arbitrary. The first sensor can be installed anywhere on the first wheel drive train. The second sensor can be placed anywhere on the main drive train or on the second wheel drive train when the inventive clutch is incorporated into a transfer case because the computing element will take the applicable gear ratios into account. Where the inventive clutch is incorporated into a locking differential, desired rotational speeds can be found simply through addition.

In an advantageous embodiment of the invention, the logic section is provided with at least a first comparator to compare the slippage signal with preset threshold slippage values, and the output signal from the comparator is supplied to an AND gate. The logic section thus ensures that the clutch can be engaged only within a given slippage range adapted to the design of the clutch.

In a preferred embodiment of the invention, outputs from a window comparator and from an acceleration comparator which detects positive and negative slippages are also supplied to the AND gate. It is thereby possible to differentiate between travel states with positive slippage and those with negative slippage. It is also possible to pass over certain engagement thresholds depending on whether the vehicle Is accelerating or decelerating.

Furthermore, the logic section is generally provided with at least one second comparator to compare the speed of at least one of the clutch halves or of the drive trains with a predetermined limit value, the output signals of said second comparator also being transmitted to the AND gate. In addition to the engagement/slippage thresholds, engagement at excessive speeds is also prevented thereby.

In further embodiments, additional safety criteria, for instance a steering angle signal or a brake light signal, may be provided to the AND gate of the logic section by means of which an undesired engagement of the clutch can be prevented. This is done since sudden bracing of the drive train (due to the sudden addition of the front wheel drive or to the locking of the differential during braking or when making a sharp turn) is undesirable and detrimental.

In a further development of the invention, the process control part of the control unit is provided with a first monostable switching element which determines the time during which the servo component is subjected to pressure. This ensures that the clutch is not damaged if the engagement does not succeed.

In a further advantageous development, the process control part is provided with yet another monostable switching element which is connected at the input to a confirmation of engagement sensor and at the output to an OR gate to which the output of the first monostable switching element is also connected. A circuit of this type makes it possible for the engagement process to be repeated automatically until the clutch is indeed engaged. That which a trained driver does intuitively when he shifts by hand, i.e., to continuously make attempts at engagement at close intervals instead of proceeding with force, thus takes place entirely automatically.

In an especially advantageous further development of the device according to the invention, the first comparator is a comparator with variable threshold values and is linked to an error compensation computer. The slippage threshold values, in particular, those at which the clutch is being engaged, can thereby be maintained constant over the entire life of the vehicle, independently of non-symmetrical wear of the vehicle tires, for example. The advantage of this procedure is considerable because the effective tire diameters may vary by several percentage points and the slippage at which the clutch can be engaged is of the same order of magnitude.

The invention also deals with a transfer case for motor vehicles having at least two driven axles, which vehicle equipped with an interengaging clutch with servo components and a control unit according to the invention. With such a transfer case, the axially movable clutch half 1e non-rotatably connected to a first wheel drive train while the non-movable clutch half is connected to the main drive train. This arrangement can be used whether the transfer case is for a vehicle with an engageable front wheel drive, or a vehicle with an interaxle differential as a connectable differential lock. In any case, this application provides a transfer case having all the advantages of the invention without significant additional construction costs.

The invention furthermore relates to an intra-axle differential for vehicles in which the interengaging clutch according to the invention is used as a differential lock. In this case too, all the advantages of the invention are achieved without significant construction costs.

The invention also relates to a method for engaging an interengaging clutch which comprises the following steps:

a) detecting a slippage signal from rotational-speed signals of two of the three drive trains, b) engaging the clutch halves through application of force on the servo component for a predetermined first time span if a first defined slippage threshold is reached, and c) repeating the application of force on the servo component after a second predetermined time span has elapsed if successful engagement of the clutch halves was not achieved during the first time span.

The essential advantages of this process consist in the fact that when the slippage is right, i.e., when the rotational-speed differential is optimal, the clutch halves become engaged substantially without jerks, and in the fact that successful engagement of the clutch halves the first time is not necessarily required so that engagement can take place with minimal adjustment force and is limited in time. Unsuccessful engagement may occur when the two clutch halves are positioned exactly, tooth against tooth.

Although the force to which the clutch is subjected when the first slippage threshold value is exceeded is applied very quickly as a rule, it may happen that the slippage increases rapidly that it becomes too high after an unsuccessful first attempt to be able to engage the clutch halves in a second attempt. To avoid this, the application of force on the servo component is cancelled when a second defined slippage threshold is exceeded.

In a development of the process according to the invention, the force applied to the servo component ends upon successful engagement of the clutch halves only after completion of a third time interval. This is done in order to compensate for transient oscillations in the power unit which may be produced by the engagement of the clutch.

In a further development of the process, negative slippage thresholds are also defined which become relevant when slippage drops, e.g., when slippage has first increased rapidly during clutch engagement, and then drops when the driver has noticed the slippage and has eased up on the accelerator. This makes it possible to avoid having to stop the vehicle, which would be very undesirable off the road, when the second slippage threshold has been exceeded. Furthermore, the clutch halves can thus be engaged gently even when travelling downhill and using the engine for braking, i.e., when negative slippage occurs.

In a refinement of the process according to the invention, a mean slippage is ascertained from the rotational-speed signals of the first and second wheel drive trains, preferably only at a low steering angle, with the clutch halves being disengaged, and with the slippage thresholds being corrected by addition with this mean slippage. This ensures that the slippage thresholds are not distorted by variations in wheel diameters.

Finally, in a further refinement of the invention, the application of pressure upon the servo component can be cancelled when at least one additional sensor signals the occurrence of an unfavorable travelling condition, for example, when the steering angle is too high.

BRIEF DESCRIPTION OF THE DRAWINGS

The invention will now be explained through the drawings illustrating the following.

DETAILED DESCRIPTION OF THE INVENTION

Figure 1:
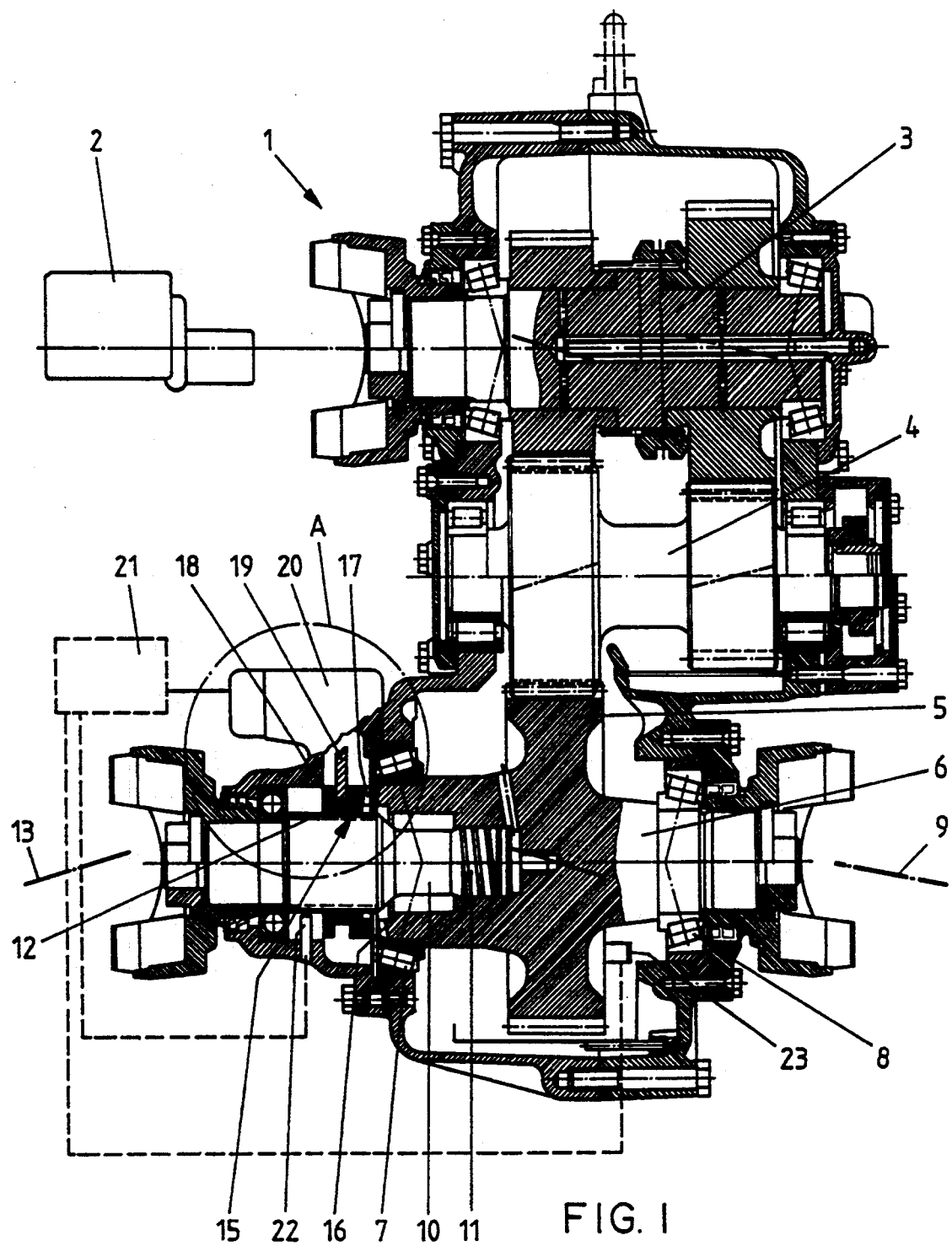
FIG. 1: a transfer case equipped with an interengaging clutch according to the invention.

FIG. 1 shows a power take-off or transfer case 1 which is driven by an engine-driven unit 2, such as a transmission, represented only symbolically. Transfer case 1 includes an input shaft 3, an intermediate shaft 4 and a drive pinion 5 which is part of a primary shaft 6 supported in bearings 7,8. Input shaft 3, intermediate shaft 4 and drive pinion 5 constitute the main or primary drive train.

In the primary shaft 6, a front axle drive shaft 10 supported by plain bearing 11 and drives the front axle (not shown) outside the transfer case via a non-designated cardan joint in a known and conventional manner. The first wheel drive train given reference number 13 begins with the front axle drive shaft 10. On the side of bearing 8, the primary shaft 6 merges into another non-designated cardan Joint in the second wheel drive train 9 which goes to the rear axle (not shown) and includes it.

In the example shown, the second wheel drive train 9 is always driven, i.e., it is permanently and integrally connected to the primary drive train. The first wheel drive train 13 is only driven when a positively engaging or interengaging clutch, such as the dog clutch in this embodiment which is designated by reference number 15, is engaged. The dog clutch 15 comprises a first clutch half 16 which is part of the primary shaft 6 and a second clutch half 17 which is made in the form of a coupling sleeve 18 and which can be engaged by means of a shift fork 19. For this purpose, a servo component 20 is provided which is controlled by control unit 21. In addition, rotational-speed sensors 22,23 of known design and such as are used for similar purposes are provided. The output signals from the rotational-speed sensors 22,23 are transmitted to the control unit 21. The rotational-speed sensor 22 detects the rotational speed of the front axle drive shaft 10 at the splined-shaft profile 12 on which the coupling sleeve 18 is guided non-rotatably, and the sensor 23 detects the rotational speed of the primary shaft 6 by scanning the teeth of the drive pinion 5. For this it is attached at an appropriate location in the housing (in FIG. 1 it is shown only in part).

Figure 2:
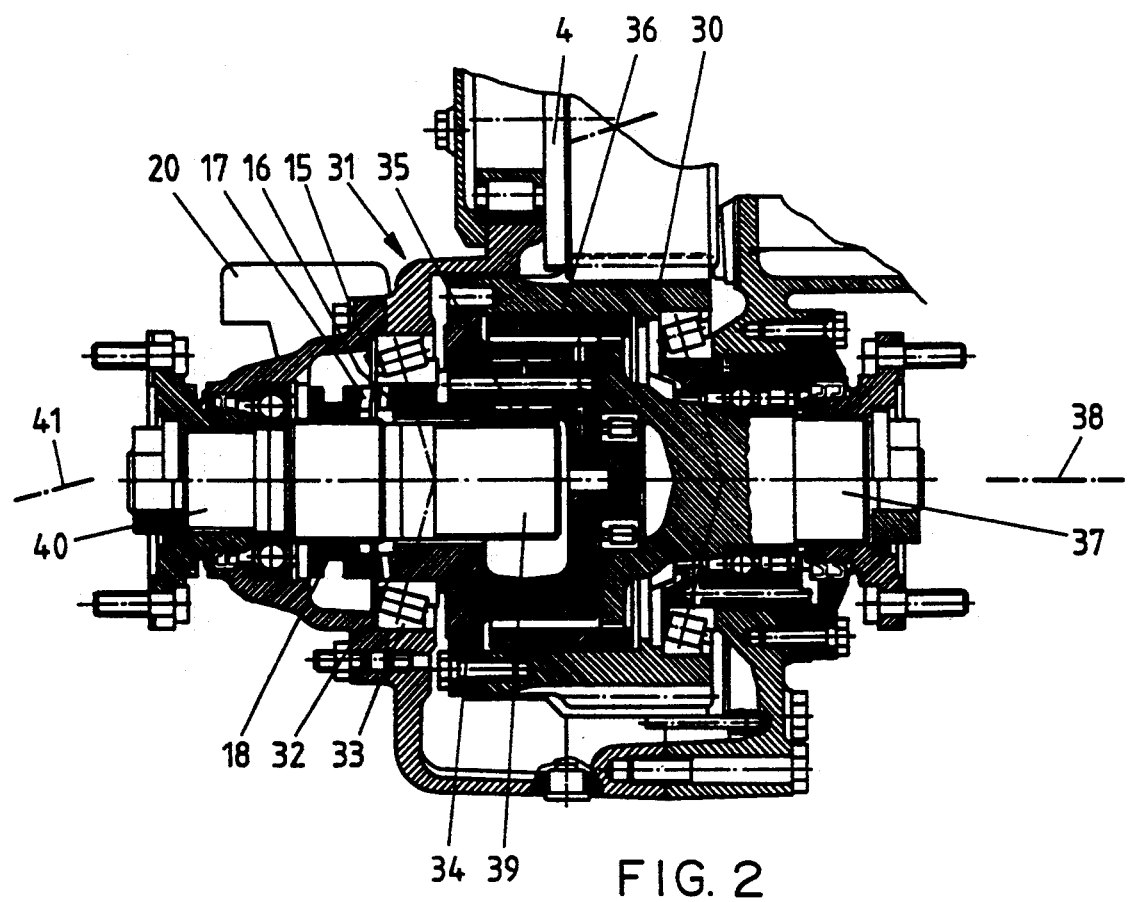
FIG. 2: a different embodiment of a transfer case equipped with an interengaging clutch according to the invention.

FIG. 2 shows a different embodiment of a transfer case which is different from the one illustrated in FIG. 1 in that it contains a central differential 31, thus allowing for permanent four-wheel drive via the central differential 31 which can be locked. For this reason, parts that are identical with those of FIG. 1 are given the same reference numbers.

The drive pinion 30 driven by the intermediate shaft 4 constitutes a differential casing for the inter-axle differential 31 and, at the same time, for the planet carrier 34. Differential 31 is provided with a sleeve 32 which is supported on a beveled wheel bearing 33. Planet gears 35 are mounted in the planet carrier 34, said planet gears 35 engaging on the outside the ring gear 36 which is part of the rear axle drive shaft 37 with which the second wheel drive train, designated by reference number 38, begins. On the inside, the planet gears 35 engage the sun gear 39 which is part of the front axle drive shaft 40 with which the first wheel drive train, designated by reference number 41, begins. Sleeve 32 includes the first clutch half 16, while the second clutch half 17 is part of the coupling sleeve 18.

Figure 3:
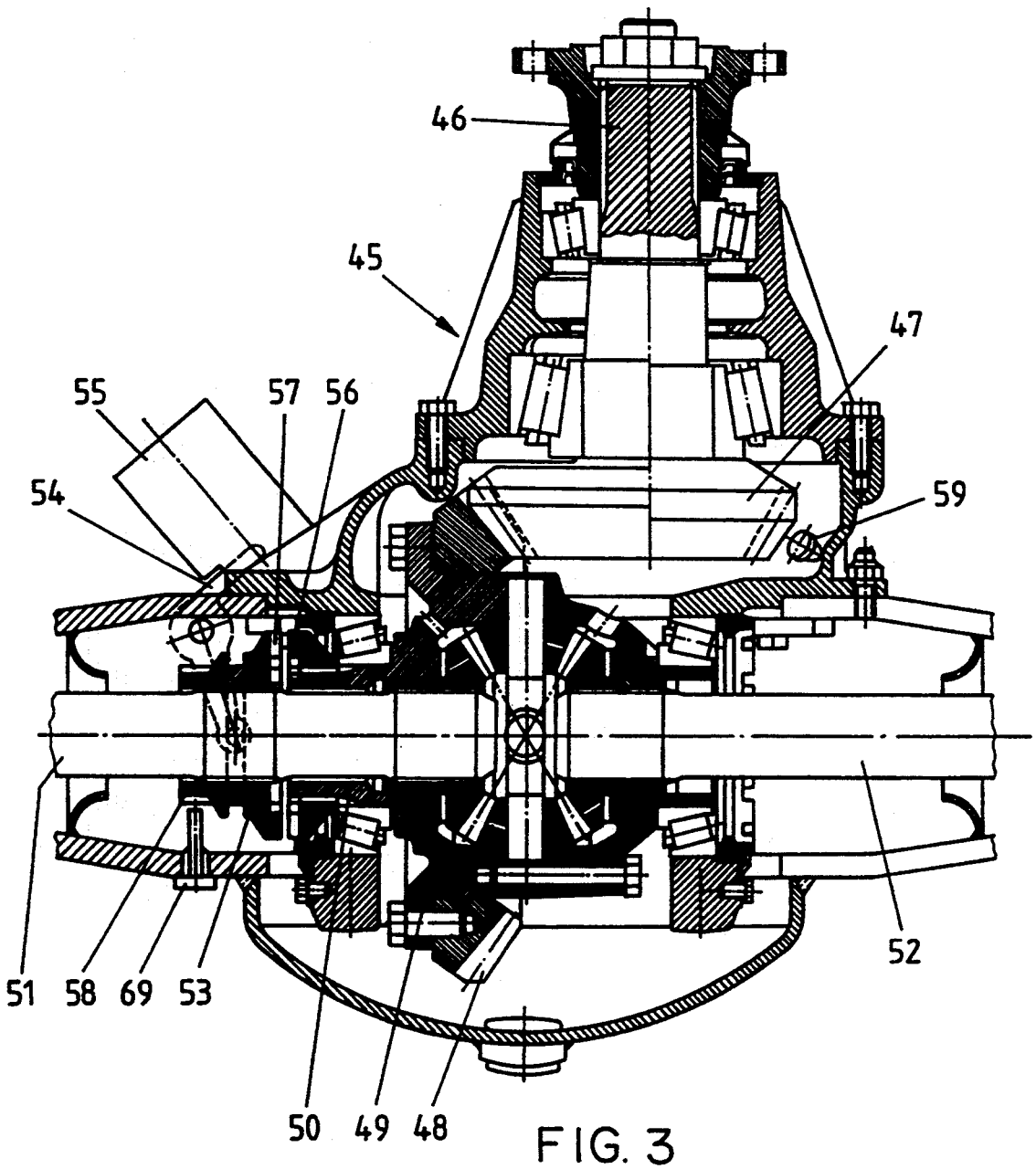
FIG. 3: an intra-axle differential equipped with an interengaging clutch according to the invention.

FIG. 3 shows an intra-axle differential 45 which could be connected to a propeller shaft (not shown) from a transfer case of the kind shown in FIG. 1 or FIG. 2.

The drive shaft 46 is here part of the main drive train. A drive pinion 47 drives a spur bevel gear 48 which is attached to the differential casing 49. The latter ends in a locking sleeve 50. The half axle 51 emerges from the left side and the half axis 52 from the right side of the differential casing, and these constitute first and second wheel drive trains, respectively. A coupling sleeve 53 which is displaced by a servo component 55 via an offset lever 54 (indicated in phantom) is mounted on the left half axle 51. The first clutch half 56 is located (and separated from it for reasons of assembly) on the locking sleeve 50, while the second clutch half 57 is located on the coupling sleeve 53. On its outer circumference, the coupling sleeve 53 is provided in part with teeth 58 to be scanned by a rotational-speed sensor 69. A second rotational-speed sensor 59 scans the drive pinion 47 and is attached for this purpose at an appropriate location in the housing.

Figure 4:
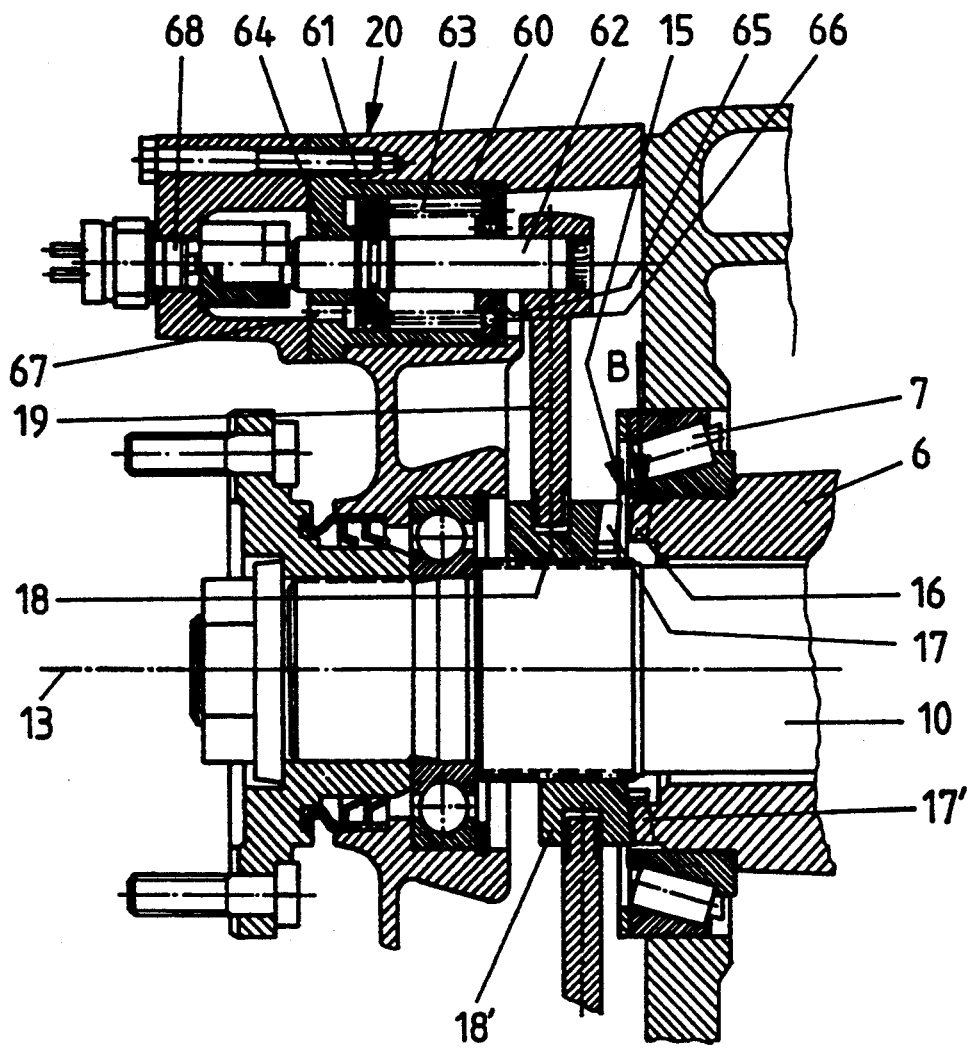
FIG. 4: an enlarged detail of the area designated A in FIG. 1.

The dog clutch 15 which is common to the three abovedescribed gearings is shown in more detail in FIG. 4. Here the first, axially fixed clutch half 16 is shown on the primary shaft 6, and the coupling sleeve 18 and the shift fork 19 on the front axle drive shaft 10 in a disengaged position in the upper half of the drawing.

The servo component 20 comprises essentially a piston 61 with piston rod 62 and a fluid cylinder 60 whose supply lines are not shown. The shift fork 19 is mounted at the forward end of the piston rod 62 and a confirmation sensor 68 the purpose of which is to confirm engagement of the clutch halves is mounted on its other end. The piston rod 62 is guided in guides 64,65 of the fluid cylinder 60.

It is significant that pressure fluid can act on the piston 61 on one side only (the left side in this case), and that a compression spring 63 which also bears upon the guide 65, acts on the other side of piston 61. The piston 61 is thus single acting and is moved to the right only when put under pressure, but is otherwise pressed to the left by the spring 63. This is its rest position in which the clutch 15 is disengaged. The engaged position of the clutch can be seen in the lower half of the drawing, where the corresponding parts are given reference numbers 17' and 18'.

Figure 5:
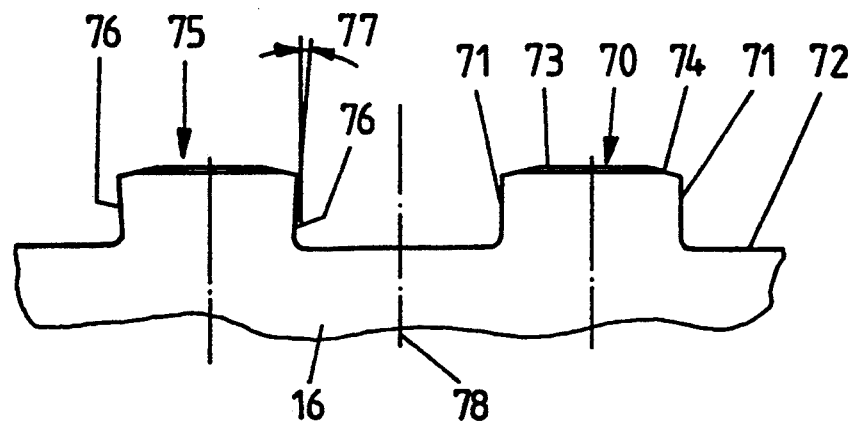
FIG. 5: an enlarged detail view of the area designated B in FIG. 4.

In FIG. 5, the dogs of the dog clutch 15 according to the invention are shown in even greater enlargement. A dog in a preferred embodiment is given reference number 70. It is provided with lateral contact surfaces 71, the generatrices of which extend in the direction of axle 78. These lateral contact surfaces may be straight or curved in radial direction, depending on the manufacturing process. The frontal surface 73, as well as the base 72 may be in a plane perpendicular to the axis or, as can be seen in FIG. 4 for example, may be located on a greatly truncated conical surface. Stops 74 are provided on the frontal surface 73 and these facilitate the engagement of the clutch when a relative movement is produced between the two clutch halves 16,17. In an embodiment modified for some applications, a dog 75 of the dog clutch is provided with lateral contact surfaces 76 which are angled inwardly at a small angle 77 (e.g., 0.5°–3°). Each of the two clutch halves 16,17 is provided with approximately five to eleven dogs 70 or 75 which are distributed evenly over their circumferences so that the dogs of one clutch half fit between the dogs of the other clutch half.

Figure 9:
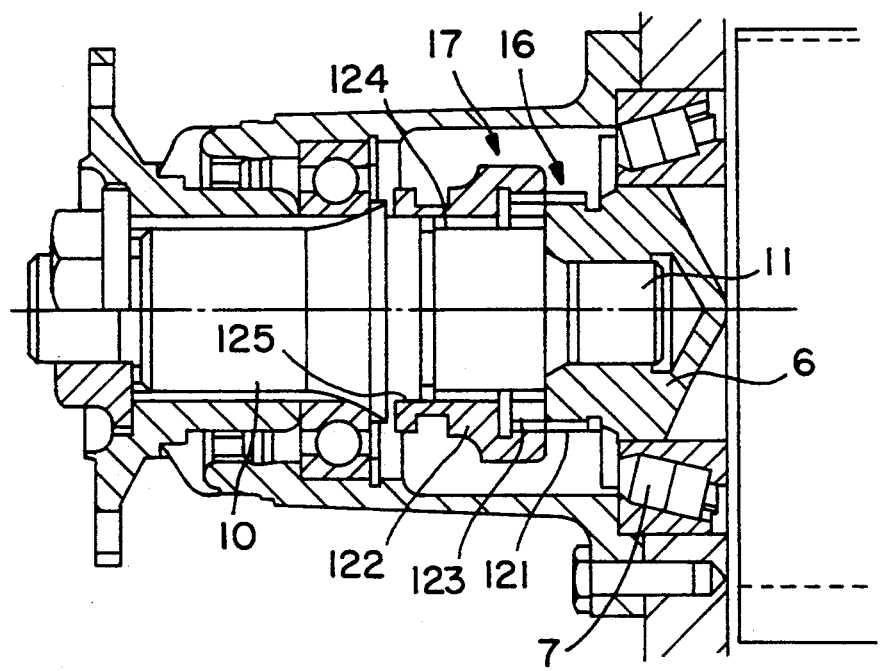
FIG. 9: the inventive interengaging clutch in a different embodiment.

In place of the dog clutch shown in FIGS. 1–4, a positively engaging clutch of the type shown in FIG. 9 could also be used. In this clutch, identical parts are given the same reference numbers as in FIG. 1. The clutch of FIG. 9 is different from that of FIG. 1 in that in place of axially projecting dogs, the clutch half 16 is provided on its outer circumference with an external profile of radially outwardly projecting dogs or teeth 121. The forward drive shaft 10 supports a coupling sleeve 122 on a keyway gearing 124, said coupling sleeve 122 being a part of clutch half 17 and having an internal profile comprising corresponding radially inwardly directed dogs or teeth 123. The coupling sleeve 122 also has as circumferential groove 125 in which the shifting fork of the engagement mechanism shown in FIG. 1 engages.

Figure 6:
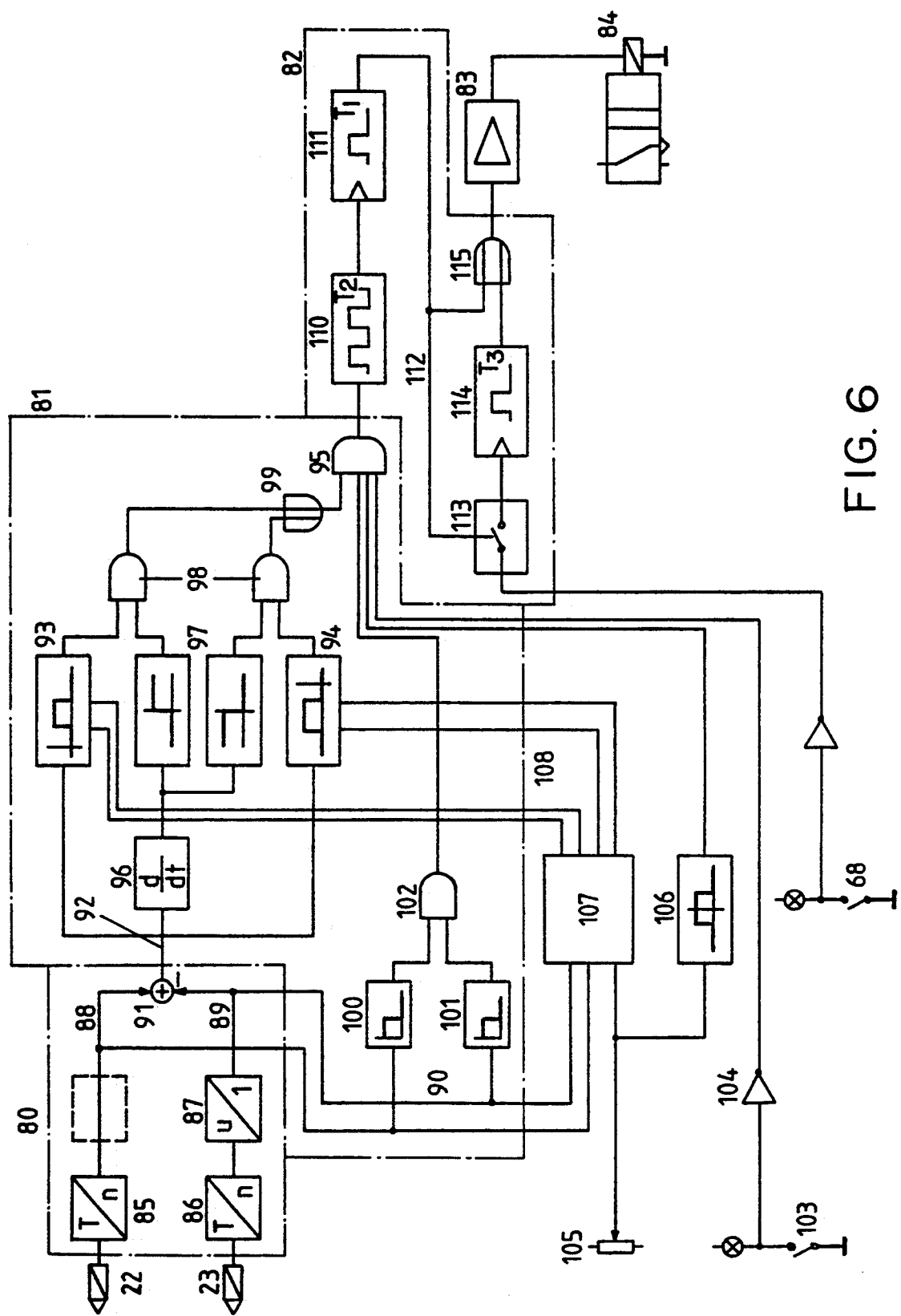
FIG. 6: an electronic circuit diagram of the control unit constituting a part of the inventive interengaging clutch.

FIG. 6 shows a simplified circuit diagram of the control unit 21. It generally comprises a signal processing part 80, a logic part 81, a process control part 82, an amplifier part 83, and a valve 84 to supply pressure for moving servo component 20 or 55.

The signal processing part 80 receives impulses from the seniors 22,23, said impulses corresponding to the teeth or markings of the scanned gear elements: for the sensor 22, the splined-shaft profiles 12 in FIG. 1 or the teeth 58 on the coupling sleeve of FIG. 3, and for the sensor 22, the teeth of the clutch gear 5 of FIG. 1 or of the drive pinion 47 of FIG. 3. These impulses are converted by the pulse-to-time converters 85,86 into rotational speed signals. If needed, a correction for gear ratio can be made by a computation element 87 in case the sensor 23, for example, is installed on a part of the intermediate shaft 4 of FIG. 1 which would require that the gear ratio be taken into account. Optionally, a second computation element (shown in phantom) can also be employed to take a gear ratio into account for sensor 22 depending on its location. The two rotational speed signals are transmitted via lines 88,89 to an analog adder 91, one of the rotational speed signals being input to the adder 91 with a negative sign so that a slippage signal is produced and transmitted along line 92. Slippage in this case indicates the difference in rotational speed between the two clutch halves 16 and 17 which is independent of sensor placing thanks to the signal processing part 80. The logic part 81 starts with the input of the slippage signal via line 92 to two window comparators 93,94 which are pre-set with two threshold values. Instead of the two window comparators, it is also possible to provide only one in the most rudimentary case, or also a double-window comparator. The slippage signal is furthermore transmitted, after passing through a differentiation element 96, to two acceleration comparators 97. The output signals from the comparators 93,94,97 are transmitted as an input to the AND gate 95 after passing through, as illustrated, the AND gates 98 and the OR gate 99.

In the embodiment illustrated, two additional comparators 100,101 are also provided, but these may be simple threshold value switches receiving the individual rotational speed signals from lines 88 and 89 via line 90 in order to monitor the rotational speed of one wheel train or the other and thus to avoid excessive rotational speeds. The outputs of these comparators 100,101 are also supplied, via an AND gate 102, as another input to the AND gate 95.

In addition, for reasons of safety, a signal coming from a brake light switch 103 which is inverted by inverter 104, and a steering angle signal coming from a steering angle sensor 105 and passing through a threshold value switch or a comparator 106, are supplied as third and fourth inputs to the AND gate 95. Therefore, if the brake light lights up and/or when a given steering angle is exceeded, the AND gate 95 cannot emit an output signal and the clutch cannot be engaged.

The line 90 also leads to an error compensation computer 107 in which the rotational-speed difference ascertained over a long period of time is determined and in which a correction signal is calculated, said correction signal being transmitted via lines 108 to threshold value setters in the comparators 93,94. The comparators 93,94 readjust the threshold values so that differences in wear, such as wear of the vehicle tires, will not have a detrimental effect. To ensure that this correction signal is produced only when the vehicle travels in a straight line, the steering angle sensor 105 is also connected to the error compensation computer 107.

The process control part 82 is connected to the output the AND gate 95 and is activated only when a positive (or high) signal is emitted from AND gate 95. The output signal from AND gate 95 is positive (or high) when all signals on the input side are also positive, signifying a commend for the engagement or the clutch. This command causes a start-stop oscillator 110 with a very low frequency of approximately 0.5 Hz to be switched This corresponds to a period of two seconds which defines a time interval referred to as the second time interval $T_2$, the significance of which is discussed below. The output impulses from oscillator 110 are transmitted to a monostable switching element 111, e.g., a monostable, the output signal of which is a single pulse of a certain length (that of a first time interval, $T_1$, e.g., 1 sec.) which is then transmitted to an OR gate 115 and via line 112 to an impulse gate 113. This impulse gate 113 (it could also be a switch or an AND gate) supplies a second monostable switching element 114 with a triggering signal if an output signal from the confirmation sensor 68 also appears during a period $T_3$ (a third time interval) of the output signal of the monostable switching element 111. The monostable switching element 114 transmits a relatively long output impulse to the OR gate 115, corresponding to the third time interval $T_3$ (e.g., 10 seconds). The OR gate 115 will thus deliver a positive output signal if a positive signal comes from either element 111 or element 114 (engagement command from 111 during the first time interval, or a holding command from 114 during the third time interval after confirmation of engagement by the confirmation sensor 68), and this positive output signal, after amplification by the amplifier 83 actuates the valve 84 associated with the servo component 20 or 55. The valve may be a simple two-way valve. If the engagement does not succeed, the start-stop oscillator 110 ensures repetition after completion of the second time interval $T_2$.

The above-described clutch is only an example of an embodiment in which many elements or clutch parts may be replaced by equivalent elements or other clutch parts without departing from the substance of the invention. Similarly, the hardware elements of the process control part 82 may be replaced by a microprocessor which can be programmed to reproduce the functioning of control unit sequentially.

Figure 7:
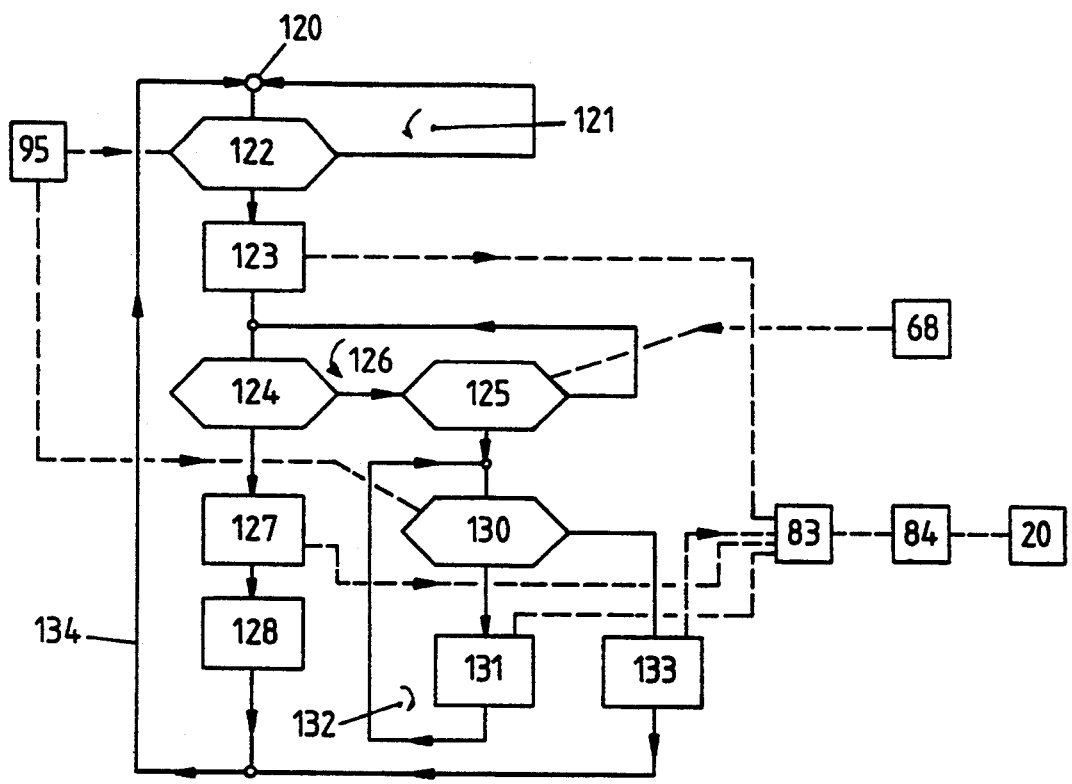
FIG. 7: a flowchart of the control unit sequence.

A flowchart of a program for carrying this out is shown in FIG. 7. 120 designates the starting point of the program. From here the program constantly asks whether a positive (high) output signal appears at the AND gate 95, corresponding to the initiation of the engagement process and which would initiate the process control part 82. For as long as this is not the case, the question "IF Release" is answered in the negative at 122 and the waiting loop 121 is repeated. This state represents normal travel of the vehicle on a firm road where no significant wheel slippage and therefore no significant slippage between the two clutch halves 16,17 occurs. As soon as slippage occurs and the other corresponding inputs of the AND element 95 are also positive, the answer in field 122 is "yes" and the program proceeds to field 123 for "Actuation" whereby the amplifier 83 is given the command to actuate the servo component 20 via valve 84.

At field 124 ("IF $t_v > T_1$") the program then asks regularly whether the first time interval (e.g., 1 second) has already elapsed. If the answer is negative, the program proceeds to field 125 ("IF Confirmation") and, if this has not occurred, it returns to field 124 and so forth in the waiting loop 126 until a positive answer is given in one of the two fields 124 or 125.

If a positive answer is given first at field 124, the first time interval $T_1$ (e.g., one second) has passed, i.e., the time during which the servo component 20 is actuated has passed. Since no confirmation from sensor 68 had been received at field 125 immediately prior to this, this means that engagement did not succeed. Further attempts are pointless, and therefore the actuation of the servo component 20 is cancelled according to field 127, a waiting period intervenes while the second time interval $T_2$ still applies (e.g., 2 seconds) according to field 128 and the program then returns along the left branch 134 to the starting point 120.

If, on the other hand, the answer at field 124 is still "no," i.e., if the first time interval has not yet passed and the confirmation by sensor 68 has already arrived (meaning that the clutch has engaged), the answer there is "yes" and the next step at field 130 is to ask whether the output of the AND element 95 still carries a positive signal ("IF Release") and whether the third time interval $T_3$ has not yet passed. If the answer "yes," actuation is stopped according to field 131 and the program returns in loop 132 to field 130 until the third time interval has passed ("no" in field 130). This means that the clutch has been engaged successfully and has been held in engaged position for ten seconds and that the actuation of the servo component 20 is then removed at field 133 ("Remove Actuation"). The program then returns on path 134 to the starting point 120 and from there goes through the waiting loop 121. The time intervals indicated here are only examples and must be selected to reflect the mechanical conditions of force transmission.

Figure 8:
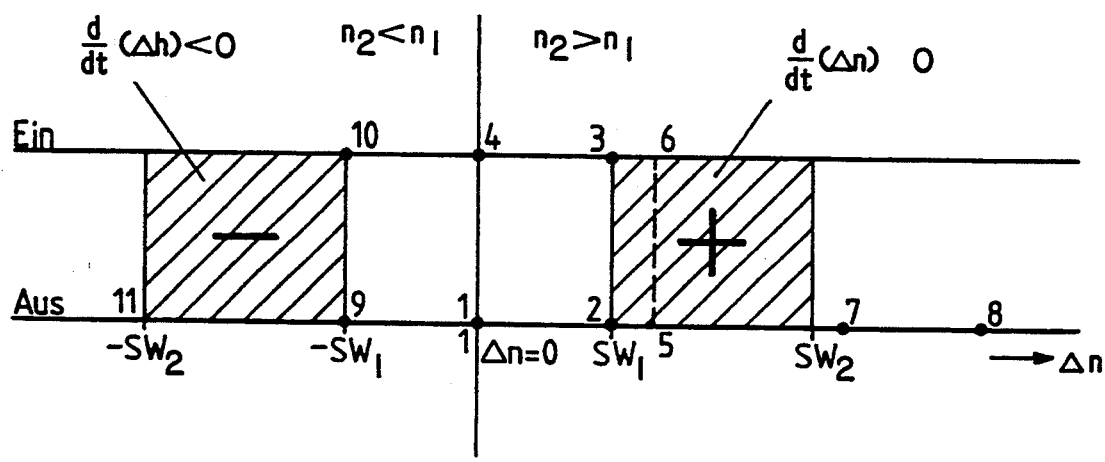
FIG. 8: a slippage threshold diagram which illustrates operation of the inventive interengaging clutch.

FIG. 8 graphically illustrates the position of the slippage thresholds and the processes connected thereto. On the axis, positive slippage values are entered to the right, i.e., those where the rotational speed of the driving clutch half 16 is greater than that of the driven clutch half 17. Negative slippage values are entered from the point of origin to the left and are those where the rotational speed of the driving clutch half 16 is less than that of the driven clutch half 17. A symbolic "OUT" line on the y-axis denotes a disengaged clutch, and an "IN" denotes an engaged clutch.

If the slippage increases slowly, the first slippage threshold $SW_1$ is reached, causing the process according to FIG. 7 to be started and engagement of the clutch is begun. If this succeeds in the first attempt, the "IN" line is reached along the line connecting points 2,3. But if several unsuccessful shifting attempts are made while slippage continues to increase then the threshold value $SW_2$ will be exceeded and shifting is no longer possible. Slippage will thus continue to increase as the points 2,5,7,8 are reached. The driver will perceive this slippage increase as an increase in engine RPM's and will ease off on the gas pedal. Slippage will then decrease from point 8 through point 7. In order to prevent shifting at this point between the two slippage thresholds $SW_2$ and $SW_1$ because this would cause a jolt to the vehicle which is opposite in direction to the direction of travel, these thresholds take effect as engagement criteria only when slippage increases and they are ignored when it decreases. Slippage will thus pass the zero line and enter the zone of negative slippage, e.g., $-SW_1$ (which is equal to the slippage $SW_1$ but is opposite in sign). Ignoring the slippage thresholds $SW_2$ and $SW_1$ during decreasing slippage is made possible by the differentiation element 96 (see FIG. 6), by the acceleration comparator 97 interacting with the window comparator 93, and by the associated AND gate 98. Slippage thus decreases from point 8 through points 7,5,2 and 1 down to $-SW_1$, at which point engagement is attempted again in the described manner when this threshold is reached. If engagement of the clutch succeeds, point 10 is attained and from there, with the clutch engaged and therefore no slippage occurring, point 4 is reached. If, however, slippage decreases so rapidly or if engagement fails here too so that slippage drops below the negative slippage threshold $-SW_2$, engagement of the clutch is again not possible.

The interaction of the logic part 81 (FIG. 6) of the control device with the slippage thresholds appropriately selected according to FIG. 8 makes it possible to achieve comfortable and gentle engagement of the interengaging clutch under all imaginable driving conditions.

While the invention has been described by reference to specific embodiments, this was for purposes of illustration only. Numerous alternative embodiments will be apparent to those skilled in the art and are considered to be within the scope of the invention.

We claim:

1. An interengaging clutch, comprising
   first and second rotatable clutch halves, said first clutch half being a driven clutch element connected to a first wheel drive train, said second clutch half being a driving clutch element and being connected to a main drive train and to a second wheel drive train, one of said first and second clutch halves being movable along an axial direction, said first and second clutch halves including engagement means with contact surfaces for engaging said first and second clutch halves together, torque being transmitted between said clutch halves when said first and second clutch halves are engaged, first and second rotational speed sensors which produce signals indicative of the rotational speeds of said first and second clutch halves, a unidirectional servo component connected to said movable clutch half, said servo component being pressure actuated on one side only so as to move said movable clutch half along said axial direction into engagement with said other clutch half, electronic control means for causing said servo component to act in a first direction only so as to bring said movable clutch half into engagement with said other clutch half when the signals produced by said first and second rotational speed sensors indicate that the difference in rotational speeds of said first and second clutch halves is greater than a first threshold value but less than a second threshold value, and spring means permanently acting on said servo component in a second direction which is opposite to said first direction with a force which is sufficient to overcome frictional forces generated on said contact surfaces when the transmitted torque falls to a predetermined level and thereby causes said movable clutch half to disengage from said other clutch half when the transmitted torque falls below said predetermined level.

2. The clutch of claim 1 wherein said contact surfaces are circumferential.

3. The clutch of claim 1 wherein said predetermined transmitted torque level is approximately zero.

4. The clutch of claim 1 wherein said engagement means comprise dogs projecting in said axial direction and said dogs include front surfaces which are circumferentially inclined.

5. The clutch of claim 1 wherein said contact surfaces comprise generatrices which are inclined at a very small angle to said axial direction.

6. The clutch of claim 1 wherein said engagement means comprise radially inwardly and outwardly extending teeth on said first and second clutch halves.

7. The clutch of claim 1 wherein said predetermined threshold values are adjustable.

8. The clutch of claim 1 wherein said electronic control means comprises signal processing means for processing the signals produced by said rotational speed sensors, logic means for determining whether to cause said movable clutch half to come into engagement with said other clutch half, process control means for producing a signal indicating that said servo component is to cause said movable clutch half to engage said other clutch half, and an amplifier which receives said signal produced by said process control means and which amplifies it.

9. The clutch of claim 8 wherein said signal processing means comprises first and second converters which receive said signals produced by said first and second rotational speed sensors and an analog adder which receives signals from said first and second converters and produces a slippage signal indicative of slippage between said first and second clutch halves.

10. The clutch of claim 9 wherein said logic means further includes at least one acceleration comparator and a window comparator for determining whether the slippage is positive or negative and which produce an output signal supplied to said AND gate based thereon.

11. The clutch of claim 10 wherein said logic means includes at least a second comparator for comparing the rotational speed of at least one of said clutch halves with a predetermined limit value and for producing an output signal based thereon which is supplied to said AND gate.

12. The clutch of claim 11 wherein said logic means further includes steering angle sensing means for determining whether a vehicle in which said clutch has been installed has exceeded a threshold steering angle and for producing an output signal based thereon which is supplied to said AND gate.

13. The clutch of claim 8 wherein said process control means includes a first monostable switching element which determines a time period for which said servo component is subjected to pressure actuation.

14. The clutch of claim 13 further comprising confirmation sensor means for producing a confirmation signal when said first and second clutch halves are engaged, and wherein said process control means includes a second monostable switching element which receives said confirmation signal and an OR gate which receives signals from said first and second monostable switching elements.

15. A transfer case having an interengaging clutch comprising, first and second rotatable clutch halves, said first clutch half being a driven clutch element connected to a first wheel drive train, said second clutch half being a driving clutch element and being connected to a main drive train and to a second wheel drive train, one of said first and second clutch halves being movable along an axial direction, said first and second clutch halves including engagement means with contact surfaces for engaging said first and second clutch halves together, torque being transmitted between said clutch halves when said first and second clutch halves are engaged, first and second rotational speed sensors which produce signals indicative of the rotational speeds of said first and second clutch halves, a unidirectional servo component connected to said movable clutch half, said servo component being pressure actuated on one side only so as to move said movable clutch half along said axial direction into engagement with said other clutch half, electronic control means for causing said servo component to act in a first direction only so as to bring said movable clutch half into engagement with said other clutch half when the signals produced by said first and second rotational speed sensors indicate that the difference in rotational speeds of said first and second clutch halves is greater than a first threshold value but less than a second threshold value, and spring means permanently acting on said servo component in a second direction which is opposite to said first direction with a force which is sufficient to overcome frictional force generated on said contact surfaces when the transmitted torque falls to a predetermined level and thereby causes said movable clutch half to disengage from said other clutch half when the transmitted torque falls below said predetermined level, wherein said first clutch half is non-rotatably connected to said first wheel drive train, and said second clutch half is fixed and is non-rotatably connected to said train drive train.

16. A differential having an interengaging clutch comprising, first and second rotatable clutch halves, said first clutch half being a driven clutch element connected to a first wheel drive train, said second clutch half being a driving clutch element and being connected to a main drive train and to a second wheel drive train, one of said first and second clutch halves being movable along an axial direction, said first and second clutch halves including engagement means with contact surfaces for engaging said first and second clutch halves together, torque being transmitted between said clutch halves when said first and second clutch halves are engaged, first and second rotational speed sensors which produce signals indicative of the rotational speeds of said first and second clutch halves, a unidirectional servo component connected to said movable clutch half, said servo component being pressure actuated on one side only so as to move said movable clutch half along said axial direction into engagement with said other clutch half, electronic control means for causing said servo component to act in a first direction only so as to bring said movable clutch half into engagement with said other clutch half when the signals produced by said first and second rotational speed sensors indicate that the difference in rotational speeds of said first and second clutch halves is greater than a first threshold value but less than a second threshold value, and spring means permanently acting on said servo component in a second direction which is opposite to said first direction with a force which is sufficient to overcome frictional forces generated on said contact surfaces when the transmitted torque falls to a predetermined level and thereby causes said movable clutch half to disengage from said other clutch half when the transmitted torque falls below said predetermined level, wherein said first clutch half is non-rotatably connected to said first wheel drive train and said second clutch half is fixed and non-rotatably connected to said main drive train.

17. A method for engaging a clutch having first and second interengaging clutch halves, comprising producing a slippage signal indicative of the rotational speed difference between said first and second clutch halves;

applying fluid pressure to a servo component which causes said first clutch half to engage said second clutch half for a first time interval when said slippage signal indicates that a first slippage threshold has been reached;

detecting whether said first and second clutch halves have become engaged;

applying fluid pressure to said servo component again after a second time interval if said first and second clutch halves have not become engaged during said first time interval; and applying no fluid pressure to said servo component if said slippage signal indicates that a second slippage threshold which is greater than said first slippage threshold has been exceeded.

18. The method of claim 17 further comprising continuing to apply fluid pressure to said servo component for a third time interval after said first and second clutch halves have become engaged.

19. The method of claim 17 further comprising, in the case of negative slippage between said first and second clutch halves, applying fluid pressure to said servo component to cause said first clutch half to engage said second clutch half when a negative first slippage threshold is reached, and applying no fluid pressure to said servo component when a negative second slippage threshold is exceeded.

20. The method of claim 17 further comprising determining a mean differential rotational speed when said first and second clutch halves are not engaged and correcting said slippage thresholds for said mean differential rotational speed.

21. The method of claim 17 further comprising detecting unfavorable driving conditions, and applying no fluid pressure to said servo component when said unfavorable driving conditions occur.

* * * * *